United States Patent
Adolph et al.

[11] Patent Number: 5,628,203
[45] Date of Patent: May 13, 1997

[54] COMBINED COOLING AND HEATING PROCESS AND DEVICE FOR CONDITIONING A ROOM

[75] Inventors: Ulrich Adolph, Leipzig; Stefan Eichholz, Kiel, both of Germany; George R. Giles, Rydon Farmhouse; Donald J. Richards, Yeovil, both of Great Britain

[73] Assignees: Hagenuk Fahrzeugklima GmbH, Schkeuditz, Germany; Normalair Garrett Ltd., Somerset, England

[21] Appl. No.: 210,688

[22] Filed: Mar. 18, 1994

[30] Foreign Application Priority Data

Mar. 18, 1993 [DE] Germany .................. 43 08 630.6

[51] Int. Cl.⁶ .................. F25B 29/00; F24F 5/00; B60H 1/32; B61D 27/00
[52] U.S. Cl. .................. 62/402; 62/401; 165/48.1
[58] Field of Search .................. 62/402, 401; 165/48.1

[56] References Cited

U.S. PATENT DOCUMENTS

| | | | |
|---|---|---|---|
| 2,477,931 | 8/1949 | King | 62/402 |
| 2,916,890 | 12/1959 | Stein | 62/402 |
| 4,207,754 | 6/1980 | Chabogeau et al. | 62/402 |
| 4,265,397 | 5/1981 | Rannenberg | 237/2 B |
| 4,445,639 | 5/1984 | Kinsell et al. | 62/402 |
| 5,121,610 | 6/1992 | Atkinson et al. | 62/402 |

FOREIGN PATENT DOCUMENTS

| | | | |
|---|---|---|---|
| 1229558 | 12/1966 | Germany | 62/402 |
| 0840590 | 6/1981 | U.S.S.R. | 62/402 |

*Primary Examiner*—John K. Ford
*Attorney, Agent, or Firm*—Cohen, Pontani, Lieberman, Pavane

[57] ABSTRACT

The invention is directed to a system and process operating on an air-standard cycle either to cool or heat a room. The system may be advantageously employed to cool or heat relatively small areas or rooms, particularly driver's cabins in locomotives and the like. In cooling operation, outside air is expanded in a turbine, cooled below ambient, and introducted into a heat exchanger. Air from the room to be cooled is introduced into the heat exchanger and heat is removed therefrom. Suitable valves are provided to change the operation of the heat exchanger to that of a regenerator and to direct the flow of air accordingly. Specifically, air heated by compression in the compressor is directly introduced into the room and air leaving the room is passed through the regenerator/heat exchanger and released into the atmosphere.

3 Claims, 1 Drawing Sheet

COMBINED COOLING AND HEATING PROCESS AND DEVICE FOR CONDITIONING A ROOM

BACKGROUND OF THE INVENTION

1. Field of the Invention

This invention relates generally to cooling and heating systems, and more particularly to a combined heating and cooling system utilizing the thermodynamic properties of air. While the present invention may be utilized to control the climate in any area it is particularly contemplated for use in driver's cabins in locomotives and the like rooms.

2. Description of the Related Art

Currently, the most popular cooling systems are based upon vapor compression processes, such as the Carnot cycle. As is well known, in a device operating in accordance with a vapor-compression refrigeration cycle, a working fluid such as FREON enters a compressor as a slightly superheated vapor at low pressure. It then leaves the compressor and enters a condenser as a vapor at some elevated pressure, where the working fluid is condensed as a result of heat transfer to cooling water or to the surroundings. The refrigerant then leaves the condenser as a high pressure liquid. The pressure of the liquid is decreased as it flows through an expansion valve, and, as a result, some of the liquid flashes into vapor. The remaining liquid, now at low pressure is vaporized in the evaporator as a result of heat transfer from the cooled spaced.

Increasing research has been directed toward alternatives to systems of the above type because they often utilize a working fluid containing chlorofluorocarbons (CFC's), such as FREON, which has been identified as a cause of ozone layer thinning and a contributor to the greenhouse effect. One such system utilizes the thermodynamic properties of air and is based on the Joule process or air-standard refrigeration cycle. In comparison to vapor-compression systems, there is generally a significantly higher energy requirement so that their application remains limited to airplanes and certain other special situations. Increasing use of air-standard cycle systems now appears likely, however, because it does not utilize the environmentally damaging coolants associated with vapor compression systems Since the energy consumed by the the system is directly proportional to the indirect greenhouse potential (due to the expenditure of fossil fuels), an air-standard cycle system must be designed so as to be at least equivalent to vapor-compression systems and electrical heating devices in terms of their environmental impact.

Since temperatures above the ambient temperature also occur in an air-standard cycle process, configurations have been proposed which provide for the simultaneous or alternative use of the process for heating and cooling so that significantly improved efficiencies and energy ratios can be achieved. Such configurations typically include two-stage compression in two separate compressors. The compressor of the first stage is driven by an electric motor and that of the second stage by the expansion or flash turbine. During the cooling process, a closed primary circuit of the air with intermediate cooling and regenerative heat exchange between the compressor of the second stage and the flash turbine is realized. The air of the secondary circuit is cooled in a load-heat exchanger downstream of the flash turbine and is then fed to the room to be cooled. An arrangement of reversing valves and bypass lines forms an open primary circuit which succeeds in feeding the warm air occurring downstream of the compressor to the load-heat exchanger so that the secondary circuit can be used to heat the room.

The advantage of the two stage compression configuration described above is that it achieves a considerable reduction in the average annual energy consumption and an improved efficiency of the system in comparison to the heating of railroad passenger coaches by electric resistance heating elements and cooling by means of vapor-compression systems. The principal disadvantage of the system, however, is its high capital cost necessitated by the need for two compressor stages, the heat exchanger for the secondary circuit, the reversing valves, and the bypass lines. Accordingly, this energy-saving construction would not be economically feasible for smaller rooms, such as the driver's cabins in locomotives or service quarters of passenger coaches.

It is therefore an object of the present invention to provide a heating and cooling system utilizing an air-standard cycle apparatus which is highly efficient when compared to vapor-compression devices and which is economical to construct and operate, even for processing the air of small rooms.

SUMMARY OF THE INVENTION

The aforementioned object, as well as others which will become apparent herein, is achieved by a system which operates in the vacuum range and which is capable of supplying cooled or heated air to a room, such as, for example, the driver's cabin of a locomotive or the like.

When switching from cooling to heating operation, four valves are switched according to the invention and the air escaping from the cabin flows through a heat exchanger required for the secondary circuit for cooling. The heat exchanger operates as a regenerator for the heating process.

The air heated by the compressor first passes into the cabin via a connection line and then via the regenerator into the open atmosphere as exhaust air. In this process, the totality of air sucked in from the environment by the turbine is used as heated fresh air for heating the cabin.

Preferably, the regulator is set to the maximum output stage in order to preheat a cold cabin without changing the circuit relative to normal heating operation. The process of the present invention is performed by a system which includes a motor-driven compressor-turbine unit, a heat exchanger for cooling the feed air or additional air of the room to be conditioned, and connection lines for interconnecting them. A reversing valve with a connection line is situated between the compressor outlet and cabin and two additional reversing valves are situated prior to and subsequent to the heat exchanger with the possibility of opening the lines to the environment.

The present invention makes it possible to significantly reduce annual energy consumption and to achieve substantially improved efficiency as compared to the use of independent resistive heating and vapor compression cooling systems. This results in a reduction in indirect contribution to the greenhouse effect. Moreover, environmental impact is lessened by dispensing with ozone depleting coolants which destroy the ozone layer. Accordingly, direct contribution to the greenhouse effect is avoided entirely.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The features and advantages of the present invention will be more readily understood from the following detailed description when read in conjunction with the accompanying drawings, in which.

DETAILED DESCRIPTION OF THE PREFERRED EMBODIMENTS

Figure 1:
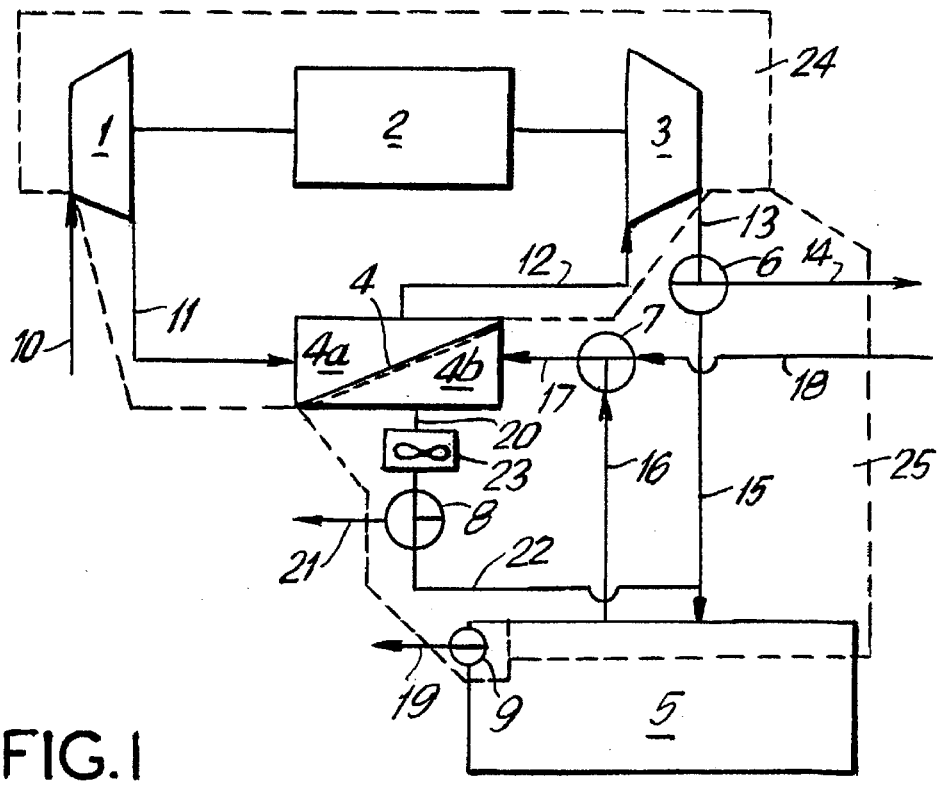
FIG. 1 depicts an illustrative air processing system constructed in accordance with the present invention and operating in a cooling mode of operation.

With reference to FIG. 1, space 24 represents the process air side and space 25 represents the air treatment side. As shown, the system comprises a driving motor 2 connected to an expander or turbine 1 and a compressor 3 via a common shaft. The system further includes a heat exchanger 4 having a process side 4a and an air treatment side 4b for removing heat from air entering the room 5 to be conditioned. As will be explained later, in accordance with a heating operation of the system, the heat exchanger 4 also functions as a regenerator. The individual elements are in fluid communication with each other by means of interconnecting pipelines. As will be described in more detail later, valves are provided in the interconnecting lines where necessary to facilitate switching between cooling and heating operations.

FIG. 1 depicts cooling operation of a system constructed in accordance with the present invention. As shown, outside or ambient air enters the turbine 1 via an inlet line 10 and exits the turbine via line 11, which line interconnects the process side of heat exchanger 4 and turbine 1. As will be readily ascertained by those skilled in the art, by expanding the process air from the atmospheric state to the vacuum pressure range in the turbine 1, the air may be cooled to a temperature below the ambient temperature. The difference in temperature between the air on the air treatment side 4b and that on the process air side 4a is utilized by heat exchanger 4 to cool air recirculated from the cabin 5. For this purpose, air from the turbine enters heat exchanger 4 and exits the same via line 12, which line interconnects process side 4a with the inlet of compressor 3.

As seen in FIG. 1, lines 13 and 15 are interconnected by valve 6. During cooling operation of the system, valve 6 is open so that the compressed hot air is released to the atmosphere via line 14. For a purpose which will be explained later, valve 6 may also be operated to establish fluid communication between compressor 3 and the interior cabin 5. In any event, as indicated above, the cool air provided by turbine 1 is utilized by heat exchanger 4 to carry away heat from cabin 5. Thus, air to be cooled is removed from the cabin via line 16, directed through valve 7, and introduced into the air treatment side 4b of heat exchanger 4. Heat is transferred from the air entering side 4b to the air entering side 4a and the resulting cooled air is directed through valve 8 via line 20 and fan 23. The cooled air then re-enters cabin 5.

It will be observed that valve 7 is operable to permit a mixture of fresh air and room air to be supplied to heat exchanger 4. To facilitate the introduction of a fresh air component, surplus air is released into the atmosphere by opening via valve 9 and line 19.

Figure 2:
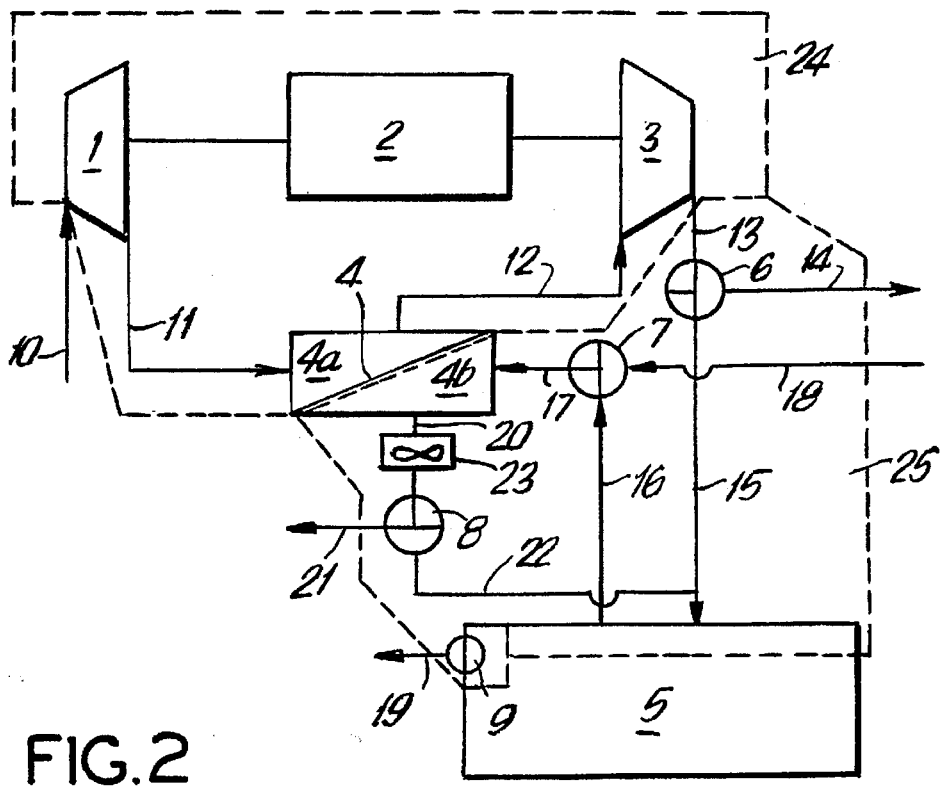
FIG. 2 shows the illustrative system of FIG. 1 being operated in a cooling heating mode of operation.

With reference now to FIG. 2, a process of heating in accordance with the system of the present invention will now be described. As shown in FIG. 2, the positions of flaps or valves 6, 7, 8 and 9 are switched so as to permit operation of heat exchanger 4 as a regenerator. Specifically, valve 6 is actuated to establish fluid communication between compressor 3 and room 5, and valve 7 is actuated to prevent the introduction of fresh air via line 18. It will be noted, however, that valve 7 continues to allow air from room 5 to be withdrawn via line 16 and introduced into treatment side 4b via line 17. Moreover, valve 8 is actuated to prevent air cooled within heat exchanger/regenerator 4 from re-entering room 5. Rather, and as shown, valve 8 is actuated to release the cooled air into the atmosphere. Finally, valve 9 is closed to prevent the release of heated air from room 5.

It will thus be readily apparent to those skilled in the art that cold process air from the turbine 1 is heated by the hot air from the cabin which reaches the air treatment side 4b of the heat exchanger via lines 16 and 17. Its temperature level continues to increase as a result of the subsequent compression in the compressor 3 and it passes via line 13, valve 6 and line 15 into the cabin 5 as warm additional air so as to heat it.

The invention is not limited by the embodiments described above which are presented as examples only but can be modified in various ways within the scope of protection defined by the appended patent claims.

What is claimed is:

1. A system for heating and cooling air in an area, comprising:

compressor means for compressing air to a point at which the air is above a temperature of the air in the area to be heated;

expander means for expanding ambient outside air to a point at which the air is below ambient temperature;

heat exchanger means for receiving air cooled by said expander means and for supplying heated air to the compressor means;

first valve means for selectively establishing fluid communication between said heat exchanger and said area in a cooling mode of operation to direct cooled air from said heat exchanger to said area, and between said heat exchanger and outside air in a heating mode of operation; and second valve means for selectively establishing fluid communication between said compressor means and outside air in a cooling mode of operation, and between said compressor means and said area in a heating mode of operation to direct heated air from said compressor means to said area.

2. The system of claim 1, further including third valve means for selectively establishing fluid communication between said heat exchanger and said area in a heating mode of operation to permit air from the area to be withdrawn and supplied to said heat exchanger, and between said heat exchanger, said area and outside air in a cooling mode of operation.

3. The system of claim 1, further including fourth valve means for selectively establishing fluid communication between said area and outside air in a cooling mode of operation to release air from the area, and blocking fluid communication between said area and outside air in a heating mode of operation.

\* \* \* \* \*